H. LAUGHTON.
POWER TRANSMISSION BELT GEARING.
APPLICATION FILED MAY 4, 1921.

1,433,958.

Patented Oct. 31, 1922.

Inventor.
Harold Laughton
By Wm Wallace White
Atty.

Patented Oct. 31, 1922.

1,433,958

UNITED STATES PATENT OFFICE.

HAROLD LAUGHTON, OF SUTTON COLDFIELD, ENGLAND.

POWER-TRANSMISSION BELT GEARING.

Application filed May 4, 1921. Serial No. 466,711.

(GRANTED UNDER THE PROVISIONS OF THE ACT OF MARCH 3, 1921, 41 STAT. L., 1313.)

*To all whom it may concern:*

Be it known that I, HAROLD LAUGHTON, a subject of the King of Great Britain and Ireland, residing at 200 Jockey Road, Sutton Coldfield, county of Warwickshire, England, have invented certain new and useful Improvements in Power-Transmission Belt Gearing (for which I have obtained Letters Patent of Great Britain, #136,422, application filed March 22, 1919, #7203), of which the following is a specification, reference being had to the accompanying drawing.

This invention relates to improvements in power-transmission belt gearing, and is applicable in cases where one of the two belt pulleys is small in proportion to the other, (such for example as where a belt drive is taken from an electro-motor and a great reduction in speed is necessary) and in which two jockey pulleys are disposed on the respective outer sides of the belt near the small main pulley, and said jockey pulleys are carried by an oscillating lever which will permit of a self adjustment of said pulleys in the plane of rotation of the main pulley. Its object is to improve the action of the jockey pulleys.

According to this invention, the jockey pulleys are carried by an arm or lever which is pivoted to a fixed point disposed on the diametrically opposite side of the main pulley from that on which the jockey pulleys are situated.

Referring to the accompanying drawings.

Like letters indicate like parts throughout the drawings.

The two jockey pulleys A and B are mounted on axles A' and B' respectively carried by a preferably curved lever C, which is mounted on a fixed axle D disposed parallel to the axis of the small main pulley E, at a point which is on the diametrically opposite side of the pulley E from that on which the jockey pulleys A and B are situated. The space between the jockey pulleys A and B, through which both sides of the belt F are carried so as to draw them together as shown, is thus in a direct line with the axis of the main pulley E and the axle D about which the carrying lever C can oscillate, and the said oscillating movement is parallel to the plane of rotation of the whole of the pulleys.

The axle D on which the lever C is mounted, may be carried by a bracket H secured to the same base or foundation as the motor.

One jockey pulley B may be adjustable on the lever C relatively to the other A. This may be effected by providing means for adjusting the position of the axle B' which carries the pulley B, on the lever C, or if preferred the pulley B may be drawn towards the other pulley A by means of a spring, or springs acting on its axle B' in order to maintain a constant pressure on the belt F.

The carrying lever C is preferably provided with a counterweight G so that it is balanced, and if preferred, it is made double as shown, so that the axles A' and B' which carry the jockey pulleys A and B are supported at both ends. The adjustment previously described is in this case effected by providing slots C' (see Figs. 1 and 3) in the lever C for the respective ends of the axle B'.

The advantages of the arrangement are that the jockey pulleys A and B are not fixed but floating, they can therefore adjust themselves to the movements of the belt F due to varying loads, the flexibility of the belt drive is for this reason not affected, and the tendency is to tighten the belt grip on the small main pulley E when the load is suddenly increased, while maintaining a regular belt tension when the load is constant.

Figure 1:
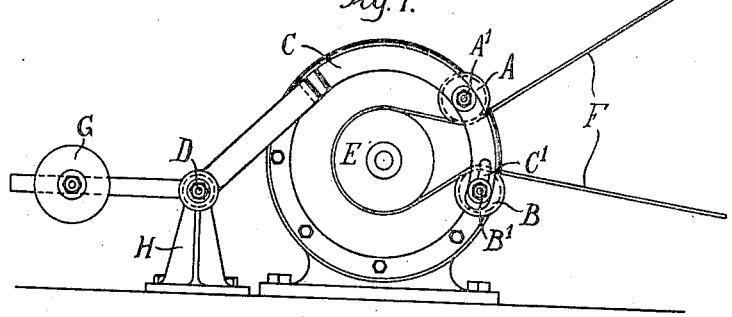
Fig. 1 is a side elevation.
Figure 2:
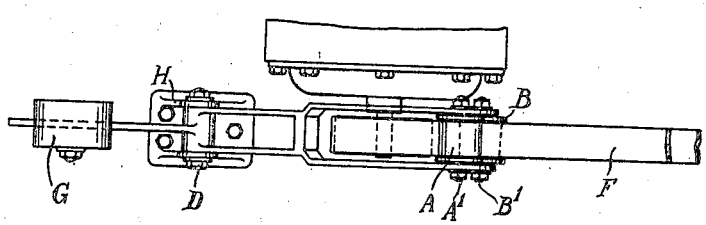
Fig. 2 is a plan showing my invention applied to the belt-drive of an electro-motor.
Figure 3:
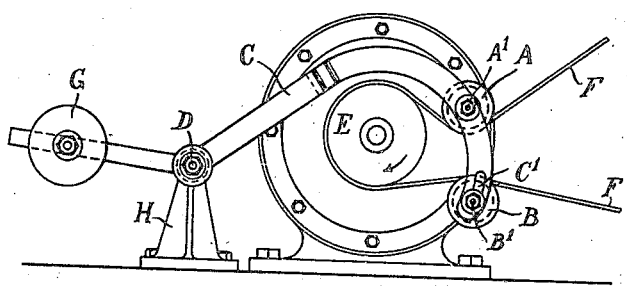
Fig. 3 is a side elevation showing the action of the arrangement.

When for instance the belt F is at rest, the jockey pulleys A and B assume the position shown in Fig. 1, but when running, the driving side of the belt which is in tension naturally attempts to assume a straight line. This action is not prevented as is the case with a fixed jockey pulley but is to a certain extent checked, as both pulleys must move together and when the tight side of the belt tends to straighten the slack side is drawn further from a straight line and compensates for the former as shown in Fig. 3, in which it is assumed that the small pulley E is the driving pulley.

Claims:

1. In a transmission system, the combination with a belt and pulley, of a counter balanced lever pivoted in axial parallelism with the pulley and carrying a pair of rollers each in contact with one of the outer sides of the belt, said rollers being normally disposed in symmetric relation to a line connecting the axes of the lever and pulley.

2. In a transmission system, the combination with a belt and pulley, of a counterbalanced lever pivoted in axial parallelism with the pulley and carrying a pair of rollers each in contact with one of the outer sides of the belt, one of said rollers being adjustable toward and from the other.

3. In a transmission system, the combination with a belt and pulley, of a counterbalanced lever pivoted in axial parallelism with the pulley, said lever having a curved portion normally disposed in concentric relation with the pulley, and a pair of rollers carried by said curved portion each in contact with one of the outer sides of the belt.

4. In a transmission system, the combination with a belt and pulley, of a counterbalanced lever pivoted in axial parallelism with the pulley, said lever having a curved portion disposed in concentric relation with the pulley, and a pair of rollers carried by said curved portion and adapted to contact with the outer sides of the belt at the side of the pulley diametrically opposite from the pivot of the lever.

5. In a transmission system, the combination with a belt and pulley, of a counterbalanced lever pivoted in axial parallelism with the pulley, said lever having a curved portion disposed in concentric relation with the pulley, and a pair of rollers carried by said curved portion and adapted to contact with the outer sides of the belt, one of said rollers being adjustable toward and from the other.

In witness whereof I have hereunto set my hand in presence of two witnesses.

HAROLD LAUGHTON.

Witnesses:
BERNARD E. DRURY,
ENSOR D. DRURY.